April 24, 1956          R. L. SINK          2,743,355
AUTOMATIC GAIN CONTROL CIRCUITS FOR PULSE RECEIVERS
Filed April 21, 1948          2 Sheets-Sheet 1
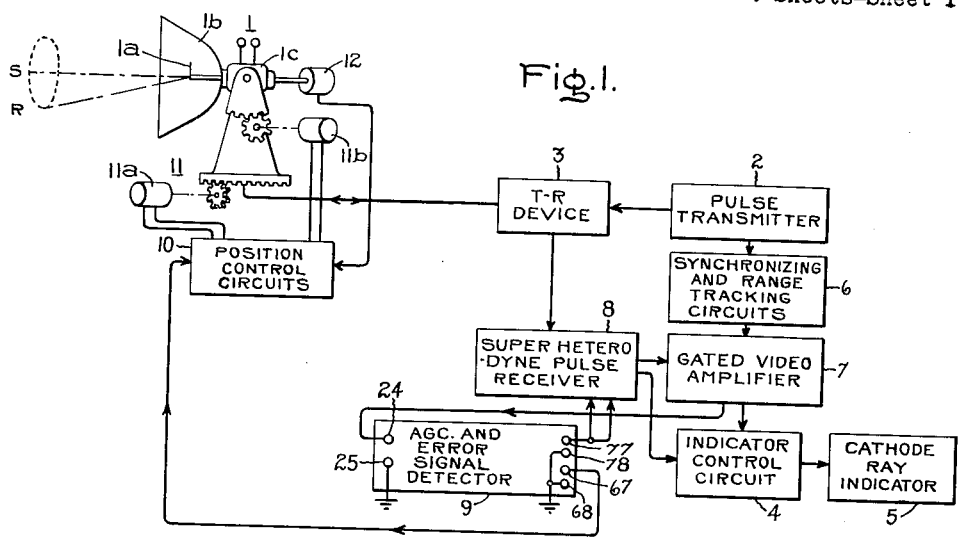
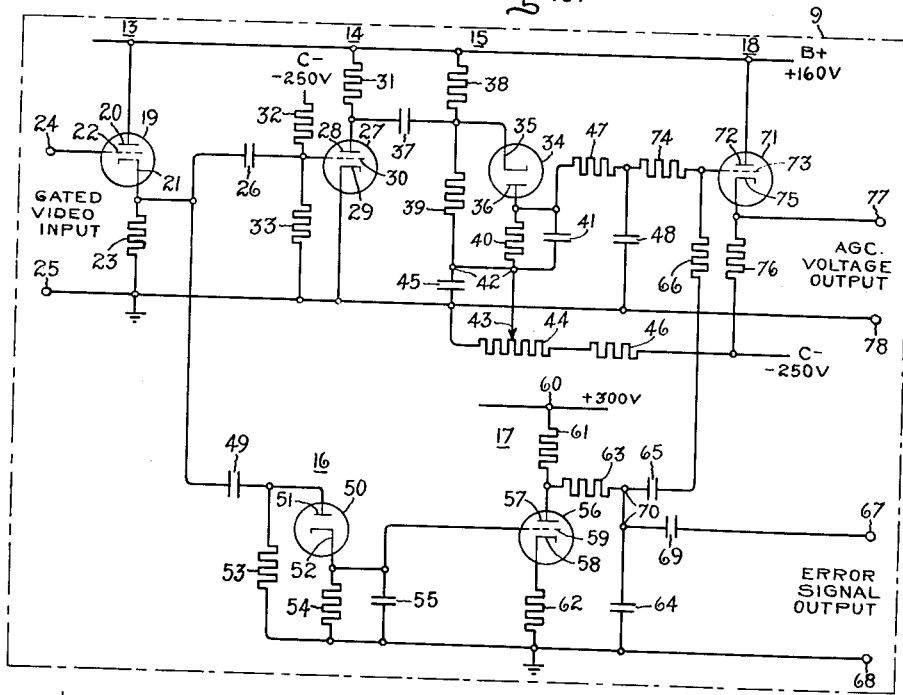
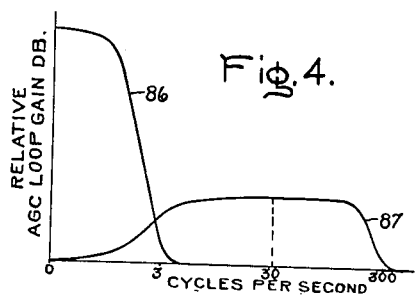
Inventor:
Robert L. Sink,
by Merton D. Moore
His Attorney.

April 24, 1956 R. L. SINK 2,743,355
AUTOMATIC GAIN CONTROL CIRCUITS FOR PULSE RECEIVERS
Filed April 21, 1948 2 Sheets-Sheet 2
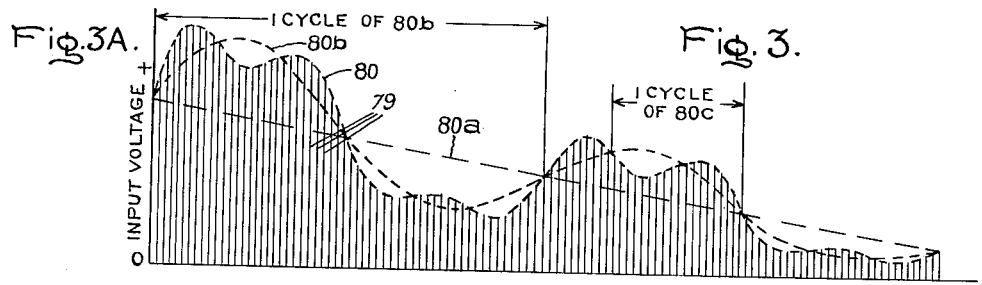
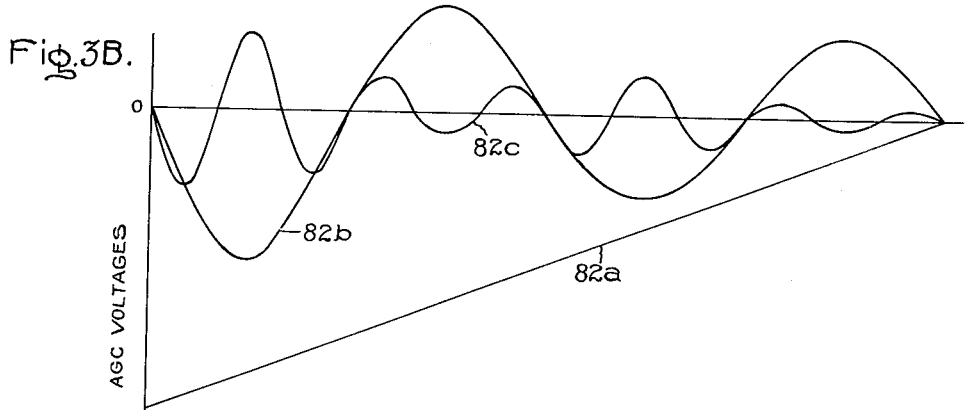
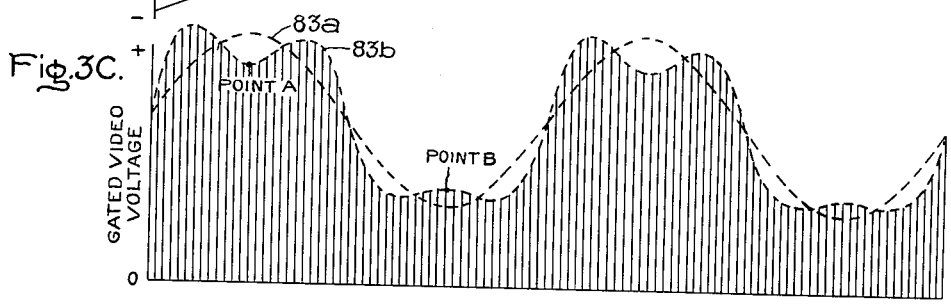
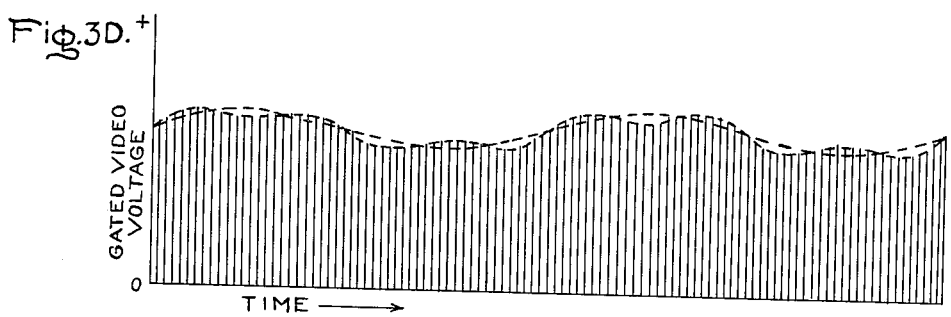
Inventor:
Robert L. Sink,
by Merton W Moore
His Attorney.

United States Patent Office 2,743,355
Patented Apr. 24, 1956

2,743,355

AUTOMATIC GAIN CONTROL CIRCUITS FOR PULSE RECEIVERS

Robert L. Sink, Altadena, Calif., assignor to General Electric Company, a corporation of New York Application April 21, 1948, Serial No. 22,421

6 Claims. (Cl. 250—20)

My invention relates to automatic gain control circuits, and more particularly to such circuits as may be employed in radar tracking receivers and similar apparatus.

In radar equipments that track an echo from a reflecting target, such as an airplane, there are a number of factors inherently tending to produce errors and to reduce the accuracy of tracking. For example, radar echoes from an aircraft in flight are affected in strength by directional errors in the pointing of the antenna, by the distance to the aircraft, by propeller modulation, and by fading due to atmospheric conditions, Doppler effects and the reflectional directivity of the target aircraft. As is well-known to those skilled in the art, useful information may be derived from directional antenna pointing errors by controlling the magnitude and phase of a locally-generated alternating voltage in accordance with the amount and direction of such errors. This voltage, or error signal, may then be utilized in antenna position controlling circuits to operate antenna positioning mechanism so as to maintain the antenna oriented toward the reflecting object. However, such error signal information may be masked by fading effects, since the residual modulation due to fading is ordinarily of the order of ten times greater than the useful information derivable from the antenna pointing errors. Such fading effects may be as large as 25 decibels and may vary at rates corresponding to several hundred cycles per second. Moreover, video circuits of the type customarily employed in such radar systems are not able to handle linearly a signal variation of much more than ten decibels. Accordingly, it is an object of my invention to provide an automatic gain control system for a radar tracking receiver which is capable of compressing all modulation of the video signals by an amount sufficient to maintain the detected level within nominal ten-decibel modulation range limit.

Another object of my invention is to provide an automatic gain control circuit for a signal receiving system which takes into account the rate of signal fading and provides an automatic gain control voltage comprising a first portion determined by the average carrier signal strength over a relatively long period of time, and a second portion determined by the signal strength over a short period of time.

Still another object of my invention is to provide an automatic gain control circuit for a video amplifying system which operates in such manner that large changes in average input signal strength have little effect on the peak video signal.

Still further objects of my invention are to provide means for reducing the amount of modulation appearing in the video circuits of a radar tracking receiver and for stabilizing and minimizing the phase shift between the modulation on the video signal and the error signal output.

For additional objects and advantages, and for a better understanding of the invention, attention is now directed to the following description and accompanying drawings, and also to the appended claims in which the features of the invention believed to be novel are particularly pointed out.

In the drawings:

Fig. 1 is a simplified block diagram of automatic radar tracking system in which my invention is suitably embodied;

Fig. 2 is a schematic circuit diagram of an automatic gain control and error signal system which may be employed in the radar system of Fig. 1;

Fig. 3 is a simplified and idealized graphical representation of several pertinent waveforms associated with the circuit of Fig. 2; and Fig. 4 is a graphical representation of the gain control potential components as functions of frequency. In the drawings, like reference numerals indicate like elements.

The automatic radar tracking system of Fig. 1 includes a known form of antenna drive assembly 1 comprising an antenna 1a eccentrically mounted within a reflector 1b and adapted to be rotated by a spinner motor 1c. It will be recognized that this forms a conical scan system in which the axis R of maximum radiation is inclined at an acute angle with respect to the line-of-sight axis S and is caused to trace a conical radiation pattern about axis S as antenna 1a rotates.

Pulse signals from a pulse transmitter 2 are indicated schematically as being supplied to antenna 1a through a transmit-receive device 3. Device 3 may be of any suitable known type which protects the radar receiving equipment from the intense transmitted pulses but which permits received echo pulses to be supplied to the receiving equipment without attenuation. Pulses from transmitter 2 are also supplied to synchronizing and range tracking circuits 6. As is known to the art, these circuits generate a series of gate pulses which are delayed in time, or range, with respect to the transmitted pulses, and which are adjustable in time so as to bracket any desired echo to be selected for position tracking. These pulses are supplied to a gated video amplifier 7, so-called because it is rendered operable to amplify received echoes only during the range gate intervals.

Echoes reflected from the target are also received by the antenna 1a and supplied through the transmit-receive device 3 to an appropriate pulse receiver 8, which may be of the superheterodyne type. The detected output of the receiver 8 is supplied through indicator control circuits 4 to a cathode ray indicator 5 and is also supplied to the gated video amplifier 7. The gated video output of amplifier 7 is then supplied both to indicator control circuits 4 and to an automatic gain control, or AGC, circuit and error signal detector 9 to be further described in connection with Fig. 2. The automatic gain control voltage from circuit 9 is fed back from terminal 77 to appropriate circuits of the receiver 8 in conventional manner. For example, automatic gain control voltage may be fed back to the second and third stages of intermediate frequency amplification.

In the type of conical scan system illustrated, it is apparent that both the transmitted pulse energy impinging on a remote target, for example an aircraft, and the echo pulse energy received at antenna 1a will vary as the axis R of maximum radiation traverses a cone unless the target lies on the line-of-sight axis S. The frequency of traversing the cone is called the error signal frequency and may for example be of the order of 30–35 cycles per second. The video pulses from receiver 8 consequently are amplitude-modulated, their envelope having an amplitude proportional to the displacement of the target from line-of-sight axis S and having a phase dependent upon the angular position of the target about axis S. Thus, the error signal is defined as the component of the rectified envelope of the video signal, due to the target being tracked, which is produced because of the displacement of the target from the line of sight.

The phase of the error signal is conventionally compared with that of a locally-generated reference voltage of the same frequency. As shown in Fig. 1, a reference voltage is generated by a tachometer generator 12, driven directly from the shaft of the spinner motor 1c that drives antenna 1b. This reference voltage is indicated schematically as being supplied to position control circuits 10. In these control circuits, it is compared electrically with the error signal voltage, supplied from terminal 67 of detector 9. This comparison is then resolved into two components which are proportional respectively to the azimuth and elevation displacement of the target with respect to line-of-sight axis S. Finally, the two components are supplied to respective servomechanisms, energizing azimuth and elevation drive motors 11a and 11b so as to move the antenna until axis S passes through the target position.

Referring now to Fig. 2, there is shown in schematic form the circuit diagram of the automatic gain control and error signal system 9 of Fig. 1. The circuit is shown comprising an input stage 13, a voltage-delayed video amplifier stage 14, a voltage-delayed video detector stage 15, an error signal detector stage 16, an error signal amplifier stage 17, and an output stage 18. The input stage 13 comprises an electron discharge device 19 having an anode 20, cathode 21 and a control electrode 22. Anode 20 of device 19 is directly connected to the positive terminal of a suitable source of unidirectional operating potential, conventionally designated by the symbol B+. Cathode 21 of device 19 is connected through a load resistance 23 to the negative terminal of the anode potential source, here shown as ground. Gated video frequency signal voltages are applied to the control electrode 22 of device 19 from terminals 24 and 25 connected to the gated video amplifier 7 of Fig. 1.

Output voltages from the stage 13, appearing across load resistance 23, are applied through a coupling capacitance 26 to the voltage-delayed video amplifier stage 14, which comprises an electron discharge device 27 having an anode 28, a cathode 29 and a control electrode 30. Anode 28 of device 27 is connected to B+ through a load resistance 31. Cathode 29 of device 27 is connected directly to ground. Control electrode 30 is connected directly to coupling capacitance 26 and is biased from a suitable source of negative unidirectional operating potential, conventionally designated by the symbol C—, by connection to a voltage divider comprising a pair of resistances 32 and 33 connected in series between C— and ground.

Output from the voltage-delayed video amplifier stage 14 is supplied to the video detector stage 15, which comprises a diode 34 having a cathode 35 and anode 36. Cathode 35 of diode 34 is connected to anode 28 of device 27 through a coupling capacitance 37, and to B+ through a resistance 38. Cathode 35 is also connected to anode 36 of diode 34 through a pair of series-connected resistances 39 and 40. Resistance 40 is shunted by a capacitance 41, the parallel combination of resistance 40 and capacitance 41 comprising the load circuit for diode 34. The junction 42 of resistances 39 and 40 is connected to ground through a movable contact 43 of a potentiometer 44, one end of which is grounded. Point 42 is also bypassed to ground through a capacitance 45. The ungrounded end of potentiometer 44 is connected to C— through a resistance 46.

The output of the video detector stage 15 appearing across load resistance 40 is supplied to the output stage 18 through a filter network of relatively long time constant, comprising a series resistance 47 and a shunt capacitance 48.

Output voltages from stage 13, appearing across load resistance 23, are also coupled to the error signal detector stage 16 through a capacitance 49. The error signal detector stage 16 comprises a diode 50 having an anode 51 and cathode 52. Anode 51 of diode 50 is connected to coupling capacitance 49 and through a resistance 53 to ground. Cathode 52 of diode 50 is connected to ground through a load circuit comprising a parallel combination of a resistance 54 and a capacitance 55.

Output voltages from the error signal detector stage 16, appearing across resistance 54, are coupled to the error signal amplifier stage 17, which comprises an electron discharge device 56 having an anode 57, a cathode 58, and a control grid 59. Anode 57 of device 56 is connected to the positive terminal of a second source of unidirectional operating potential 60, which is somewhat more positive than B+, through a load resistance 61. Control grid 59 of device 56 is connected to the cathode 52 of diode 50. Cathode 58 of device 56 is connected to ground through an unbypassed bias resistance 62.

Output from the error signal amplifier stage 17 is filtered by a filter network of relatively short time constant, comprising a series resistance 63 and a shunt capacitance 64, and is supplied through a coupling capacitance 65 and a resistance 66 to the AGC output stage 18. An error signal output is obtained, in a manner to be hereinafter more fully described, at terminals 67 and 68, through a coupling capacitance 69 connected to the junction 70 of resistance 63 and capacitance 64.

The AGC output stage 18 has been shown as comprising an electron discharge device 71, the anode 72 of which is directly connected to B+. Filtered output voltage from the video detector stage 15 is supplied to the control electrode 73 of device 71 through a decoupling resistance 74, and filtered output voltage from the error signal amplifier stage 17 is supplied to control electrode 73 through coupling capacitance 65 and decoupling resistance 66. The cathode 75 of device 71 is connected to C— through a load resistance 76. Automatic gain control voltage appears across load resistance 76 and is supplied to suitable receiver circuits. As previously described in connection with Fig. 1, this voltage may for example be supplied to the second and third stages of intermediate frequency amplification (not shown) from terminals 77 and 78.

In operation, a gated video frequency signal, as previously defined, is applied to the control electrode 22 of device 19 from the input terminals 24 and 25. The presence of a signal on control electrode 22 causes a positive pulse voltage to be developed across load resistance 23. The video amplifier tube 27 is normally biased beyond cutoff, and thus is voltage-delayed, from the source C— by means of the voltage divider comprising resistance 32 and 33. When the output of device 19 exceeds the cutoff potential of device 27, anode current flows in device 27 and an amplified voltage drop appears across resistance 31. Diode 34 is still further voltage-delayed by virtue of being biased a predetermined potential beyond cut-off from C— through resistance 46 and a variable portion of potentiometer 44. Consequently, the negative-going signal at the anode 28 of device 27 is applied to the cathode 35 of diode 34, and in the presence of such a negative-going signal, diode 34 conducts. Thus, a rectified signal appears across load resistance 40. This rectified signal is increasingly negative with increasing video signal at the grid 22 of device 19 and is filtered by the relatively long time constant filter, comprising resistance 47 and capacitance 48. Therefore, a delayed automatic gain control voltage, which follows variations in the input signal at a low frequency such as 2 to 3 cycles per second, appears at the grid 73 of output device 71. This slow automatic gain control voltage always acts to decrease the gain, since the video detector 34 is biased beyond cutoff, and is employed to control the average gain of the receiver and to hold the peak video signal to a substantially constant amplitude.

The positive voltage appearing across load resistance 23 of the input stage 13 is also coupled to the anode 51 of the error signal detector diode 50, causing conduction between cathode 52 and anode 51 thereof. The resultant rectified voltage appearing across the diode load resistance 54 is supplied to the control electrode 59 of the error signal amplifier 56. The appearance of signal on the grid 59 of device 56 results in a voltage appearing across load resistance 61 which follows the envelope of the gated video signal pulses. The output voltage of the error signal amplifier is filtered by the relatively short time constant circuit comprising resistance 63 and capacitance 64 and is coupled to the control electrode 73 of output device 71 through the network consisting of resistor 66 and capacity 65. Thus, an automatic gain control voltage which is responsive to rapid variations in the input video signal amplitude, such as may be caused by fading and which may occur at frequencies up to several hundred cycles per second, is also supplied to the grid 73 of device 71. This fast automatic gain control voltage is employed to compress the modulation of the gated video signal, due to fading and antenna rotation. The output stage 18 combines the fast and slow components and provides a single automatic gain control voltage across load resistance 76.

In order to facilitate the explanation of the operation of the circuits shown in Fig. 2, there is shown in Fig. 3 a simplified and idealized graphical representation of several pertinent waveforms associated therewith, all on a common time scale. Fig. 3A shows the gated video input signal, composed of short echo pulses 79, which appear at terminals 24 and 25 of Fig. 2 when no automatic gain control feedback is employed. In the simplified representation shown, the envelope 80 of the gated video echo pulses 79 may be analyzed into three sinusoidal modulation components each of constant frequency and constant amplitude. It will be understood that such simplified waveforms are illustrated only for purposes of facilitating the explanation of the circuit operation and do not necessarily apply exactly in a practical case.

The three modulation components of the input wave are:

(1) A very low frequency component 80a, having a frequency of the order of zero to two or three cycles per second, which represents the inherent drift in the average gain of the receiver, plus changes in average received signal strength. Only a small fraction of a cycle of this component appears on the expanded time scale of Fig. 3;

(2) An alternating frequency component 80b (shown superimposed upon 80a), having a frequency of the order of from two or three to 200 or 300 cycles per second and an amplitude corresponding to a modulation of up to 90% or more, which represents changes in the received signal strength due to fading and other atmospheric effects; and (3) An intermediate frequency component 80c, for example of 30–35 cycles per second, corresponding to the desired position error signal due to the variation in signal strength with antenna rotation, as previously described. This component is clearly observable in the composite envelope 80 in Fig. 3, as indicated by the interval of one cycle thereof.

Fig. 3B is a similar simplified graphical representation of the sinusoidal components of the AGC voltages derived in the circuits shown in Fig. 2. Component wave 82a is a very low frequency component derived in the voltage delayed detector 34 of Fig. 2. This corresponds to components 80a in Fig. 3A and is the result of slow drifts in receiver gain and changes in echo magnitude. The high frequency AGC voltage, derived in the error signal detector 50 and fed into the grid 73 of AGC output tube 71, consists of two components:

(1) A voltage component 82b of relatively large magnitude, which is the result of fading effects and corresponds to component 80b in Fig. 3A; and (2) A voltage component 82c of relatively small magnitude, which corresponds to error signal voltage 80c due to the rotation of the antenna beam axis R about the radar line of sight axis S when the target is displaced from the line of sight.

In a conventional system, component 82a alone is used as the AGC voltage to control the gain of the receiver. It is important that the cutoff frequency of the output filter 47, 48 in the low frequency AGC circuit be considerably lower than the antenna spin frequency, so that negligible phase shift is introduced in the error signal by the action of the low frequency AGC circuit. However, if the low frequency component 82a alone were used in the AGC loop, while the slow drifts in gated video voltage magnitudes would be essentially eliminated, the high frequency components of the modulation would be left unaffected. Fig. 3C illustrates the wave shape of the gated video voltage when only the low frequency AGC loop is connected. The component 83a of the envelope of the gated video voltage is the result of fading and the component 83b (shown superposed on 83a in the final envelope) is the error signal modulation component.

In order for the range tracking circuits 6 and the error signal circuits in block 9 of Fig. 1 to function properly, it is important that the peak value of the video voltage be kept within about 10 decibels of the optimum value. It can be seen from Fig. 3C that the ratio of the gated video signal strength at point A to that at point B in the wave is determined by the amount of fading and can be greater than 15 to 1 in voltage. At the extremes of this fading (points A and B), the operation of the error signal circuits and the range tracking circuits may become faulty, resulting in poor range tracking and distortion of the error signal voltage. This is caused by the fact that these circuits should have a limited range of input voltage for satisfactory operation.

This difficulty can be completely eliminated by compressing the modulation in the gated video signal voltage by means of an additional AGC circuit responsive to the range of frequencies from two or three to 200 or 300 cycles per second. This is accomplished in accordance with my invention by feeding back some of the error signal detector output into the AGC output tube 71. In the illustrated form of the invention, the components 82b and 82c of the error signal output are fed into the AGC loop. These components change the gain of the receiver in such a manner as to reduce the fluctuations in the gated video voltage, thus compressing the amplitude modulation of this voltage. The amount of compression depends upon the gain of the high frequency AGC loop.

Fig. 3D illustrated the waveshape of the gated video voltage when both low and high frequency components of the AGC voltage are used in the feedback loop. It can be seen that the range of variation of the gated video signal can be made much smaller through the use of this AGC circuit, which means that both the range tracking and error signal circuits will function much more satisfactorily. A further advantage of this system is that the AGC circuit forms a degenerative feedback loop for frequencies including the error signal frequency which results in less phase shift in the error signal circuits than would be the case if the high frequency AGC loop is not used. Since phase shift in the error signal circuits results in poor angular position tracking, the use of this circuit materially improves the angular tracking performance.

The wave of Fig. 3D is envelope-demodulated in the error signal detector 50, amplified in amplifier 56 and fed to the antenna positioning mechanism 10 through terminals 67 and 68, thereby causing position-tracking of the target in the manner previously described.

The gain-frequency characteristics of the AGC circuit are shown in Fig. 4. The gain of the low frequency circuit, represented by curve 86, is very high, to take care of the slow changes in signal strength which can be of more than 60 decibels. The low frequency gain characteristics 86 drops off at a frequency in the order of two or three cycles. The high frequency AGC gain characteristic 87 begins to take over at about 3 cycles per second and is substantially flat over the frequency range including the error signal frequency and extending to frequencies of the order of 200 to 300 cycles per second.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In a pulse receiver, an automatic gain control system comprising a source of gated amplitude-modulated video frequency pulse waves, means for rectifying amplitude peaks of said waves which exceed a predetermined minimum level, a long time constant filter connected to said rectifying means for passing only slow variations in the amplitude of said rectified waves, means for separately detecting amplitude modulation frequencies in said pulse waves, means for amplifying the output of said detecting means, a short time constant filter connected to said amplifying means for passing rapid voltage amplitude variations at high modulation frequencies, means for combining a portion of the output of said second filter with the output of said first filter, and means for impressing said combined output on said receiver to modify the gain thereof.

2. In combination, a pulse receiver for supplying recurrent pulses of one polarity, said pulses being amplitude-modulated by a desired signal of a predetermined frequency, said pulses being subject to undesired amplitude variations at higher frequencies due to fading and the like and also being subject to further undesired slow variations at low frequencies due to drift effects in said receiver and the like, means connected to the output of said receiver for translating said pulses only when they exceed a predetermined amplitude level, first detecting means connected to the output of said translating means and having an output network of long time constant relative to said predetermined frequency for developing a slowly-varying gain control potential, second detecting means connected to the output of said receiver and having an output network of relatively short time constant relative to said predetermined frequency for developing a rapidly-varying gain control potential, means for combining said gain control potentials, and means controlled by their resultant potential to reduce the gain of said receiver at said undesired lower frequencies to a substantially greater extent than at said predetermined frequency.

3. In combination, a pulse receiver for supplying recurrent pulses of one polarity, said pulses being amplitude-modulated by a desired signal of a predetermined frequency, said pulses being subject to undesired amplitude variations at higher frequencies and also to further undesired slow variations at low frequencies, means for rectifying amplitude peaks of said pulses which exceed a predetermined level and developing a first gain control voltage therefrom, said first means having negligible voltage output at said predetermined frequency and a rapidly increasing voltage output at lower frequencies, means for detecting amplitude modulation in said pulses and developing a second gain control voltage therefrom, said second means having a voltage output which varies inversely as a function of frequency with respect to said first voltage up to a frequency corresponding to said predetermined frequency and a substantially constant output over a range including said predetermined and higher frequencies, and means controlled by the algebraic sum of said voltages for reducing the gain of said receiver at said lower undesired frequencies to a substantially greater extent than at said predetermined and higher frequencies.

4. In a radar receiving system, means for amplifying and supplying recurrent echo pulses, said pulses being gated in range and amplitude-modulated by an error signal of predetermined frequency, said pulses being further subject to undesired amplitude modulation at both higher and lower frequencies, means for selecting only portions of said pulses exceeding a predetermined delay bias level, a first gain control detector circuit responsive only to peaks of said selected portions for developing a slow gain-control potential, said detector circuit including a filter network of relatively long time constant and having a gain-frequency characteristic which is maximum at zero frequency and which decreases rapidly to zero at a frequency below said predetermined frequency, a second gain control detector circuit for separately detecting amplitude modulation in said pulses without voltage delay and for developing a fast gain control potential, said second detector circuit including a filter network of relatively short time constant compared to the periods of said lower frequencies and having a gain-frequency characteristic which is substantially flat at said predetermined and said higher frequencies, and means for combining said gain-control potentials and utilizing their resultant to reduce the gain of said amplifying means so as concurrently to compress said modulation at said predetermined and higher frequencies to some extent and to reduce said undesired modulation at said lower frequencies to a substantially greater extent.

5. In combination, a receiver of recurrent video pulses carrying undesired low frequency amplitude modulation components, a band of undesired relatively high frequency amplitude modulation components, and a desired amplitude modulation component included in said band of frequencies, a first detector connected to the output of said receiver for detecting only the peaks of said video pulses which exceed a given threshold level, a long time constant circuit connected to said first detector output for separating said undesired low frequency components from the remaining components, a second detector connected to the output of said receiver for detecting said video pulses of substantially all amplitudes, a relatively short time constant circuit connected to the output of said second detector for separating the modulation components contained in said band from the remaining components, means for additively combining said separated components, means for applying said combined components in de-generative phase to said receiver for gain control purposes, and a utilization circuit connected to the output of said short time constant circuit for utilizing said desired modulation components.

6. An automatic gain control system for a radio receiver, comprising a source of gated amplitude-modulated video frequency pulse waves, means for rectifying amplitude peaks of said waves which exceed a predetermined minimum level, a long time constant filter connected to said rectifying means for passing only slow variations in the amplitude of said rectified waves, means for separately detecting amplitude modulation frequencies in said pulse waves, a short time constant filter connected to pass rapid amplitude variations at high modulation frequencies, and means for impressing the combined outputs of said long and short time constant filters on said receiver to modify the gain thereof.

(References on following page)

References Cited in the file of this patent

UNITED STATES PATENTS

| | | |
|---|---|---|
| 1,931,866 | Heising | Oct. 24, 1933 |
| 2,159,822 | Seeley | May 23, 1939 |
| 2,275,389 | Feldman | Mar. 3, 1942 |
| 2,282,101 | Tunick | May 5, 1942 |
| 2,408,821 | Stearns | Oct. 8, 1946 |
| 2,422,069 | Bedford | June 10, 1947 |
| 2,422,334 | Bedford | June 17, 1947 |
| 2,427,691 | Pritchard | Sept. 23, 1947 |
| 2,451,632 | Oliver | Oct. 19, 1948 |
| 2,472,301 | Koch | June 7, 1949 |

FOREIGN PATENTS

| | | |
|---|---|---|
| 118,548 | Australia | Nov. 30, 1942 |